United States Patent

Burdelski et al.

[11] 3,713,306
[45] Jan. 30, 1973

[54] COUPLING

[75] Inventors: Theo Burdelski; Klaus Gurtner, both of Dusseldorf, Germany

[73] Assignee: Ferroplast, Theo Burdelski & Co., Dusseldorf, Germany

[22] Filed: Mar. 5, 1971

[21] Appl. No.: 121,484

[30] Foreign Application Priority Data

Nov. 26, 1970 Germany.....................20582187

[52] U.S. Cl.............................64/14, 16, 27 NM

[51] Int. Cl............................................F16d 3/64

[58] Field of Search............64/9, 11, 14, 16, 27 NM

[56] References Cited

UNITED STATES PATENTS

| 3,074,254 | 1/1963 | Jones, Sr............................64/11 |
| 1,665,895 | 4/1928 | Rieger................................64/14 |
| 2,699,656 | 1/1955 | Anderson et al........................64/9 |
| 2,867,103 | 1/1959 | Williams..............................64/11 |
| 2,989,857 | 6/1961 | Helland et al..................64/27 NM |
| 3,321,935 | 5/1967 | Wildhaber....................64/14 XN |

Primary Examiner—Kenneth W. Sprague
Attorney—Norman D. Blodgett

[57] ABSTRACT

The invention is concerned with a tooth coupling with exchangeable coupling teeth, consisting of inner and outer casings, wherein the inner surface of the outer casing has tooth-shaped recesses and the outer surface of the inside casing has recesses for attaching removable coupling teeth.

14 Claims, 3 Drawing Figures

INVNTORS:
THEO BURDELSKI
KLAUS GÜRTNER
BY
Morans Blodgett
ATTORNEY

COUPLING

BACKGROUND OF THE INVENTION

It has been suggested in the past that toothed couplings be designed so that the tooth segments are exchangeable. The segments have been positioned in a ball joint or inside casing in such a way that better exchange of worn parts can take place; the teeth lie in dove-tailed grooves formed in the ball joint. Such couplings have been complicated and expensive; the segments are replaced only with difficulty. These and other difficulties experienced with the prior art devices have been obviated in a novel manner by the present invention.

It is, therefore, an outstanding object of the invention to provide a toothed coupling that is simple in design and that has inexpensive and more readily-replaced wearing parts.

Another object of this invention is the provision of a gear-type coupling in which the replaceable teeth can be made on a simple machine tool, such as a lathe.

With these and other objects in view, as will be apparent to those skilled in the art, the invention resides in the combination of parts set forth in the specification and covered by the claims appended hereto.

SUMMARY OF THE INVENTION

In general, the invention consists of a coupling having inner and outer casings, and the outer surface of the inner casing is provided with recesses for the detachable mounting of coupling teeth. These recesses are positioned in pairs with recesses in the outer casing, such that each pair cooperate to give a cross-section that corresponds to the cross-section of the individual coupling teeth. Clamping devices provided at the ends of the inner casing serve to hold the teeth in the recesses.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 2:
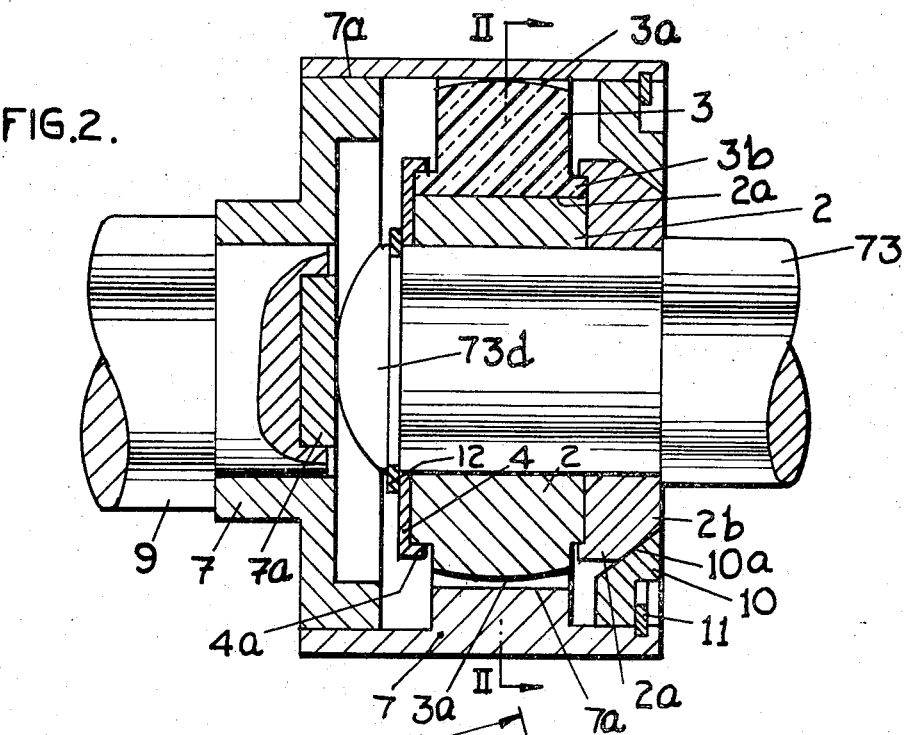
FIG. 2 is a longitudinal sectional view of the coupling, taken on the line I–I of FIG. 1.
Figure 1:
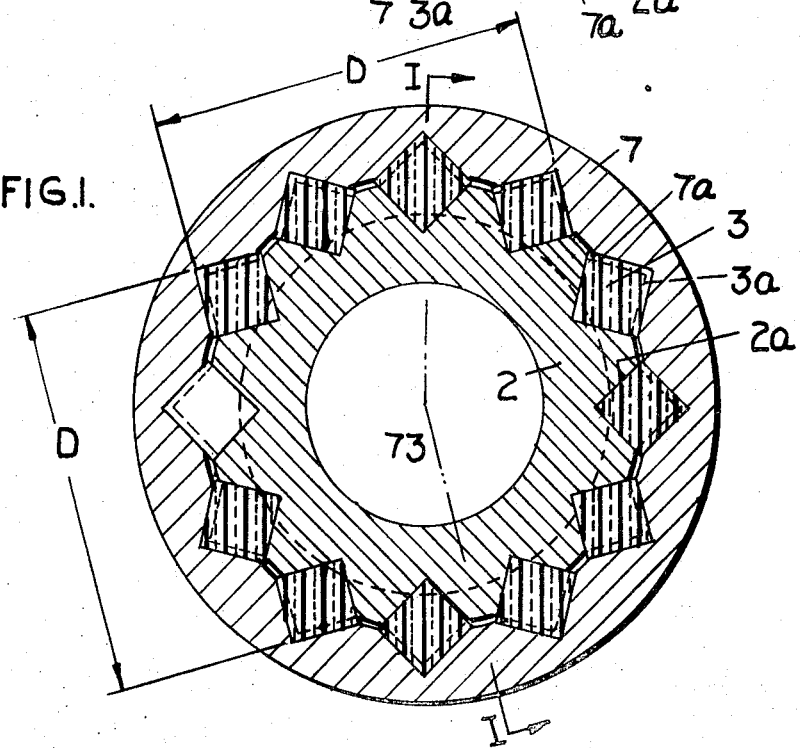
FIG. 1 is a transverse sectional view of a coupling incorporating the principles of the present invention, taken on the line II–II of FIG. 2.

In accordance with the principles of the present invention, the tooth recesses are formed in the inner casing in such a way that each opposing pair has a cross-section which corresponds in shape and size to the cross-section of the individual coupling teeth. The coupling teeth are set loosely in the recesses of the inside casing, and arresting devices are arranged on the two ends of the inner casing. Preferably, this common cross-section of the recesses in the outer and inner casing can be that of a square. The arresting devices for holding the coupling teeth on the inner casing consists of locking discs mounted on the shaft of the inner casing and secured against movement in the axial direction. The coupling teeth have lugs on both ends which interlock with flanges on the locking discs. The lug and flanges of both parts have circumferential areas which are directed to the shaft axis. The coupling teeth consist of synthetic plastics and are soaked in a grease, such as molybdenum sulfide.

In the design of the tooth coupling as an arched-tooth coupling according to this invention, the coupling teeth have a square cross-section in which a pair of corners are arranged on a common radial connection line to the axis shared by the outer casing and the inner casing. The other pair of corners is arranged on the cylindrical division plane between the outer casing and the inner casing. The number of teeth is preferably four or a multiple of four, such as twelve. The areas of the recesses lie in a plane and the opposing areas in the lined-up position of the tooth recesses run parallel. Especially of advantage is a design in which four coupling teeth are offset by 90° to each other to form a square with their outer edges, the outer areas of four coupling teeth always being offset on the circumference by 90° and positioned on cylindrical shells crossing each other by 90°. The edges of the locking discs may have locking ring areas on the inside sloped to correspond to beveled end areas of the coupling teeth and they may be pressed against the coupling teeth. At least one of the two locking discs can be designed as ring disc and may be screwed on a circumferential thread which is located on the inner casing.

The fabrication of this toothed coupling is inexpensive because of the simple design. The wearing parts can be exchanged easily and rapidly. Because the wearing parts all have the same shape, the storage of large numbers of different parts is not necessary. The toothed coupling designed as arch-tooth coupling contains an especially desirable tooth form which results in very little tooth deformation, even when there is a large angular misalignment between the inner and outer casings. The outer tooth flanks of the inserted teeth are cylindrical. When four teeth are always positioned over the corner, the tooth flanks are positioned in pairs on two cylindrical shells which cross each other. This arrangement causes each tooth (during each 360° of turning) to pass four times through a completely force-free position, while four other teeth are equally under maximum loading. The cylindrical tooth flanks make simple production methods possible; for example, on common lathes, with simple measurement and maintenance of tolerance. Every tooth takes part in the torque transmission, particularly if plastic is used with a slight pre-stress. Every tooth rests on the outer casing and ball joint (inner casing) with two flanks each. With a 90° corner angle, the tooth cross-section is a square. The tangential force acts upon the tooth as a pressure force only and the tooth is not subjected to any bending stresses. The teeth are preferably made from elastomer plastic, so that the coupling is not only articulate, but also elastic within limits. The teeth may also be mounted with a slight pre-stress, so that the coupling works without play. By the use of synthetics, which is soaked in a grease such as molybdenum sulfide, additional greasing and oiling is not required when only small loads are to be moved. With small angular misalignment, only small deformation will result, so that the teeth may also be made from a metal, such as bronze. The flanks of the outer casing and the inner casing are plane and parallel in pairs, so that simple fabrication methods and broad tolerances are possible.

The type of mounting by use of locking discs whose rims are sloped to the inside and dish-shaped and contain ring areas which rest on the corresponding sloped side areas of the coupling teeth, gives a special and advantageous type of mounting of the coupling teeth. This is because the teeth with the locking discs designed in the described manner, by proper dimensioning and with the help of the ring areas sloping to the inside, are pressed tightly into the recesses of the inner casing. This means that, by a pre-stressing of the two discs against the side areas of the coupling teeth, a coupling is created which practically acts like a one-part member. At least one of the two locking discs can be designed as a ring disc and may be screwed on a circumferential thread of the inner casing (ball joint).

The outer casing 1 is provided with V-shaped longitudinal grooves (shown in cross-section) 1a, which are arranged radially on its inside circumference. Within the outer casing 1 is arranged a partially sphere-shaped ball joint 2 which has the same number of radial, V-shaped longitudinal grooves 2a. The longitudinal gooves 1a and 2a are similarly-shaped, and the opposing areas of the recesses run parallel and in aligned positions. Twelve longitudinal grooves 1a, 2a are formed on the circumference of the outer casing 1 and on the circumference of the inner casing 2. In the preferred embodiment, the angle between two side-by-side longitudinal grooves is 30°. The corners of the grooves 1a, 2a, are positioned on the same radii from the shaft axis. The side edges are positioned on the dividing circle between outer casing 1 and inner casing 2.

In the grooves 1a, 2a are placed the arch-teeth forming coupling teeth 3; their cross-sections in this case are squares. Four teeth 3 are offset 90° to each other on the circumference and form the corners of a square. The outer 3a surfaces of these four are enclosed by the outer casing 1 and are positioned on cylindrical shells crossing each other by 90° with the diameter "D" determining the arch-tooth shape. The coupling teeth 3 are made from plastic saturated with molybdenum sulfide, or they may be made from a metal such as bronze. The coupling teeth 3 are inserted into the grooves with small pre-stress and free of play. On both sides the teeth are equipped with nose-shaped lugs 3b whose circumferential surfaces are concentric to the central axis of the outer casing 1. The lugs 3b interlock with flanges 4a arranged on a lock disc 4. The lock disc 4 is attached to the shaft pivot 13 by a lock washer 12. The nose-shaped lugs 3b on the other end of teeth 3 are interlocked with flanges 2a which are arranged on a part 2b of the ball joint 2. The part 2b of the ball joint 2 is positioned in a ball cup 10a of a lock disc 10 which is mounted against outer casing 1 with the help of lock washer 11. The shaft 13 ends in a spherical end 13a which presses against a pressure plate 7a of a coupling flange 7 which, in turn, presses tightly to prevent turning on a shaft stub 9.

Figure 3:
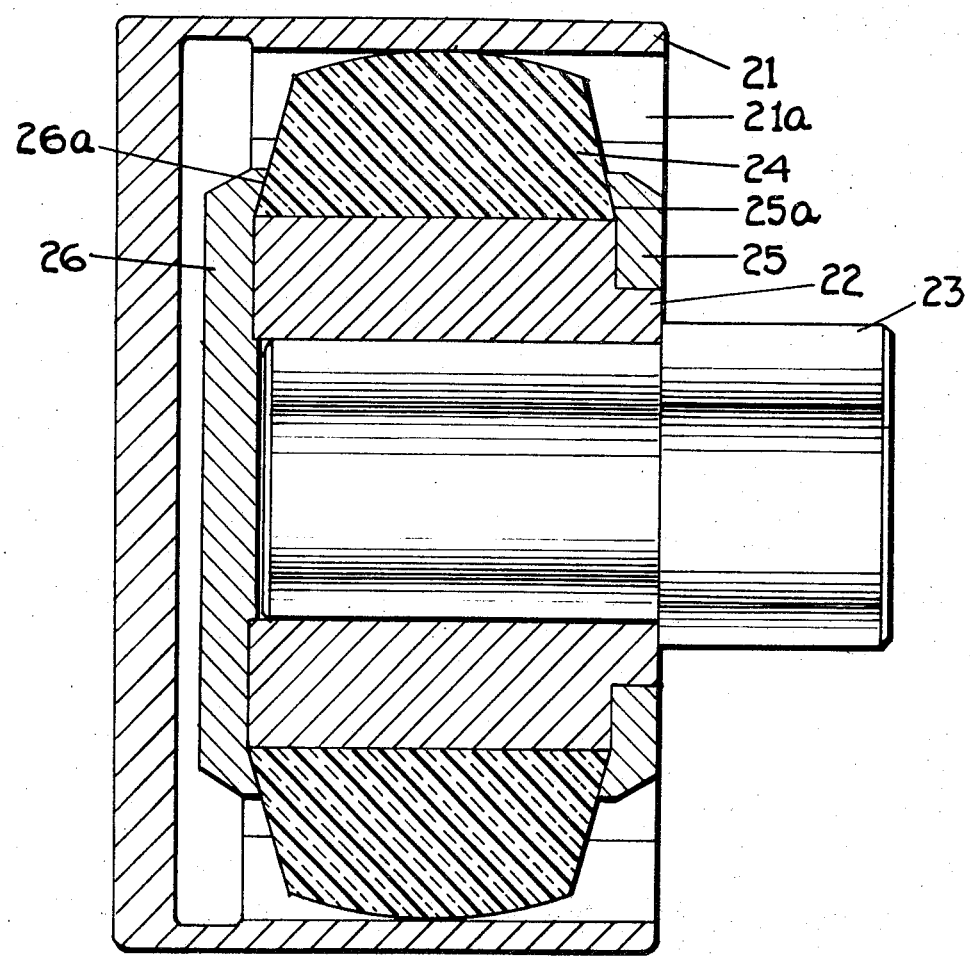
FIG. 3 is a longitudinal sectional view of a modified form of the invention.

The coupling tooth cross-section could, for example, have the shape of a Rhombus (diamond), etc. The described coupling is especially suitable for use in rolling mills for main and secondary drives. In the version of the coupling shown in FIG. 3, the outer casing 21 equipped with teeth 21a envelopes the inside casing 22 mounted on a shaft 23. The coupling teeth 24 are beveled on their ends. On the beveled surfaces are positioned the dish-shaped surfaces 25a and 26a of the lock discs 25 and 26. The lock disc 25 is designed as a ring disc mounted on the inside sleeve 22 and the lock disc 26 is screwed, as dish disc, to the free front end of the shaft 23.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A coupling, comprising
    (a) An outer casing having recesses arranged about a central axis and extending longitudinally thereof,
    (b) an inner casing having an outer surface provided with recesses which extend longitudinally of the said axis,
    (c) elongated teeth detachably lying lengthwise in the recesses in the inner casing, the tooth recesses in the other housing and the recesses in the inner housing being positioned in pairs and in opposition, each pair of recesses having a cross-sectional shape which is similar to the cross-sectional shape of the individual teeth.
    (d) clamping devices arranged generally perpendicularly of the axis at ends of the inner casing and fastened thereto to hold the individual teeth in the recesses of the inner casing.

2. A coupling as recited in Claim 1, wherein the common cross-section of the recesses within the outer and inner casing is a square with the diagonal line joining two corners being radial of the said axis.

3. A coupling as recited in Claim 1, wherein the clamping devices for the coupling teeth consist of locking discs axially secured and mounted on the inner casing.

4. A coupling as recited in Claim 1, wherein the coupling teeth are equipped with lugs on both ends which interlock with axially-extending flanges on the locking discs.

5. A coupling as recited in Claim 4, wherein the lugs have cylindrical circumferential surfaces which are directed toward the axis.

6. A coupling as recited in Claim 1, wherein the coupling teeth are formed of synthetic plastic.

7. A coupling as recited in Claim 6, wherein the plastic coupling teeth are soaked in molybdenum sulfide.

8. A coupling as recited in Claim 1, wherein the coupling teeth are of arch-tooth form and in any cross-section have a square profile, one corner pair being located on a radial line from the axis of the inner casing, the other corner pair being arranged on a common circle between the outer casing and the inner casing.

9. A coupling as recited in Claim 8, wherein the number of coupling teeth is a multiple of four.

10. A coupling as recited in Claim 8, wherein the flanks lie in a plane and opposing flanks run parallel to each other.

11. A coupling as recited in Claim 8, wherein a group of four coupling teeth are offset from each other by 90° forming with their outer edges a square.

12. A coupling as recited in Claim 11, wherein the outer flanks of the said four coupling teeth are offset on the circumference by 90° and are positioned on cylindrical shells crossing each other by 90°.

13. A coupling as recited in Claim 3, wherein the locking discs are equipped with annular surfaces of dish shape concave inwardly, rest on sloped end surfaces of the coupling teeth, and can be placed in tension against the teeth.

14. A coupling as recited in Claim 13, wherein at least one of the locking discs is designed as a ring disc and can be screwed onto the end of the inner casing.

* * * * *